United States Patent
Lee et al.

(10) Patent No.: US 10,560,938 B2
(45) Date of Patent: *Feb. 11, 2020

(54) RETRANSMISSION METHOD FOR DYNAMIC SUBFRAME SETTING IN WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR);
Hanbyul Seo, Anyang-si (KR);
Hakseong Kim, Anyang-si (KR);
Inkwon Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,171

(22) Filed: Jul. 5, 2018

(65) Prior Publication Data

US 2018/0338309 A1    Nov. 22, 2018

Related U.S. Application Data

(63) Continuation of application No. 15/195,409, filed on Jun. 28, 2016, now Pat. No. 10,034,285, which is a
(Continued)

(51) Int. Cl.
*H04W 72/04* (2009.01)
*H04L 5/00* (2006.01)
(Continued)

(52) U.S. Cl.
CPC ....... *H04W 72/0446* (2013.01); *H04J 3/1682* (2013.01); *H04L 1/1822* (2013.01);
(Continued)

(58) Field of Classification Search
CPC . H04W 24/02; H04W 56/001; H04W 56/002; H04W 72/042; H04W 72/0446;
(Continued)

(56) References Cited

U.S. PATENT DOCUMENTS

| | | | |
|---|---|---|---|
| 2011/0032855 A1* | 2/2011 | Kim | H04L 5/0037 370/294 |
| 2011/0035639 A1* | 2/2011 | Earnshaw | H04L 1/1812 714/748 |

(Continued)

FOREIGN PATENT DOCUMENTS

| | | | | |
|---|---|---|---|---|
| EP | 2234292 A1 * | 9/2010 | | H04B 7/2656 |
| KR | 10-2009-0088287 A | 8/2009 | | |
| KR | 10-2009-0095592 A | 9/2009 | | |

*Primary Examiner* — Joshua Kading
(74) *Attorney, Agent, or Firm* — Dentons US LLP

(57) ABSTRACT

Disclosed is a method for allowing a terminal to transmit and receive signals to and/from a base station in a wireless communication system using a time division multiplexing method. Specifically, the method comprises the steps of: receiving a request signal for resetting into a second uplink/downlink setting while transmitting and receiving a signal according to a first uplink/downlink setting; terminating an uplink retransmission process associated with a specific uplink subframe when the use of the specific uplink subframe is changed into a downlink subframe according to the second uplink/downlink setting; and applying the second uplink/downlink setting at a specific time point to transmit and receive signals.

4 Claims, 12 Drawing Sheets

Related U.S. Application Data continuation of application No. 14/002,017, filed as application No. PCT/KR2012/001666 on Mar. 7, 2012, now Pat. No. 9,407,390.

(60) Provisional application No. 61/472,610, filed on Apr. 6, 2011, provisional application No. 61/466,917, filed on Mar. 23, 2011.

(51) Int. Cl.
    *H04L 5/14*     (2006.01)
    *H04L 1/18*     (2006.01)
    *H04W 76/27*     (2018.01)
    *H04J 3/16*     (2006.01)

(52) U.S. Cl.
    CPC .......... *H04L 1/1887* (2013.01); *H04L 5/0007* (2013.01); *H04L 5/0048* (2013.01); *H04L 5/0055* (2013.01); *H04L 5/0057* (2013.01); *H04L 5/143* (2013.01); *H04W 72/042* (2013.01); *H04W 72/0413* (2013.01); *H04W 76/27* (2018.02); *H04L 5/0094* (2013.01)

(58) Field of Classification Search
    CPC ............ H04W 72/0493; H04W 72/12; H04W 72/1205–1257; H04W 72/1263–1273; H04W 72/1278–1294; H04W 72/14; H04L 1/1822; H04L 1/1861; H04L 1/1864; H04L 1/1887; H04L 1/1854; H04L 1/1893; H04L 1/1896; H04L 1/1607; H04L 5/0007; H04L 5/003; H04L 5/0053–0057; H04L 5/0078; H04L 5/0085; H04L 5/0087; H04L 5/0091; H04L 5/0092; H04L 5/0094; H04L 5/0096; H04L 5/22; H04L 5/26; H04L 5/14; H04L 5/143; H04L 5/1469; H04J 3/1682; H04J 3/16

See application file for complete search history.

(56) References Cited

U.S. PATENT DOCUMENTS

| | | | | |
|---|---|---|---|---|
| 2011/0292894 A1* | 12/2011 | Wu | ................. | H04L 1/1812 370/329 |
| 2012/0113875 A1* | 5/2012 | Alanara | ............ | H04W 72/1236 370/280 |
| 2012/0163250 A1* | 6/2012 | Chin | ................. | H04W 56/001 370/280 |
| 2013/0058233 A1* | 3/2013 | Kim | ................. | H04L 5/001 370/252 |
| 2013/0142268 A1* | 6/2013 | Gao | ................. | H04W 76/14 375/252 |
| 2014/0161001 A1* | 6/2014 | Gao | ................. | H04W 72/0446 370/280 |

* cited by examiner (a) contol - plane protocol stack (b) user - plane protocol stack (a) 1TX or 2TX (b) 4 TX — # RETRANSMISSION METHOD FOR DYNAMIC SUBFRAME SETTING IN WIRELESS COMMUNICATION SYSTEM AND APPARATUS FOR SAME This application is a continuation of U.S. application Ser. No. 15/195,409 filed on Jun. 28, 2016, now allowed, which is a continuation of U.S. application Ser. No. 14/002,017 filed on Aug. 28, 2013, now U.S. Pat. No. 9,408,159 issued on Aug. 2, 2016, which is a 35 U.S.C. § 371 National Stage entry of International Application No. PCT/KR2012/001666 filed on Mar. 7, 2012, which claims priority to U.S. Provisional Application Nos. 61/466,917, filed Mar. 23, 2011; and 61/472,610 filed Apr. 6, 2011, all of which are incorporated by reference in their entirety herein.

FIELD OF THE INVENTION

Embodiments of the present invention relate to a wireless communication system, and more particularly to a retransmission method and apparatus used in the case in which a dynamic subframe is established in the wireless communication system.

BACKGROUND ART

As a representative example of a wireless communication system of the present invention, 3$^{rd}$ Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

DETAILED DESCRIPTION OF THE INVENTION

Technical Problem

Accordingly, the present invention is directed to a retransmission method and apparatus used in the case in which a dynamic subframe is established in a wireless communication system.

Technical Solution

The object of the present invention can be achieved by providing a method for transmitting/receiving a signal to/from a base station (BS) by a user equipment (UE) in a time division multiplexing (TDM) wireless communication system, the method including: receiving a reconfiguration request signal for a second uplink(UL)/downlink(DL) configuration while signals are transmitted/received according to a first UL/DL configuration; if a use of a specific uplink (UL) subframe is changed to a use of a downlink (DL) subframe by the second UL/DL configuration, terminating an uplink (UL) retransmission process associated with the specific UL subframe; and transmitting/receiving signals using the second UL/DL configuration at a specific time. The reconfiguration request signal may be received through a higher layer.

The termination of the UL retransmission process may include: setting a response of a signal transmitted to the specific UL subframe to an acknowledgment (ACK). The method may further include: receiving a signal indicating deactivated decoding of a response of the signal transmitted to the specific UL subframe.

The method may further include: receiving information regarding an application timing point of the second UL/DL configuration.

In accordance with another aspect of the present invention, a user equipment (UE) device for use in a time division multiplexing (TDM) wireless communication system includes: a radio frequency (RF) communication module configured to receive a reconfiguration request signal for a second uplink(UL)/downlink(DL) configuration while signals are transmitted/received according to a first UL/DL configuration; and a processor, if a use of a specific uplink (UL) subframe is changed to a use of a downlink (DL) subframe by the second UL/DL configuration, configured to terminate an uplink (UL) retransmission process associated with the specific UL subframe, wherein the processor controls the RF communication module to transmit/receive signals using the second UL/DL configuration at a specific time.

The processor may set a response of a signal transmitted to the specific UL subframe to an acknowledgment (ACK) so as to terminate the UL retransmission process. The RF communication module may receive a signal indicating deactivated decoding of a response of the signal transmitted to the specific UL subframe.

The RF communication module may receive information regarding an application timing point of the second UL/DL configuration.

The second UL/DL configuration may include a combination of one or more UL/DL configurations, and the reconfiguration request signal may include a combination of the one or more UL/DL configurations and specific information regarding a length of the combination.

Effects of the Invention

As is apparent from the above description, according to exemplary embodiments of the present invention, a retransmission operation can be efficiently performed when a dynamic subframe is allocated in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a $3^{rd}$ Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary.

Figure 1:
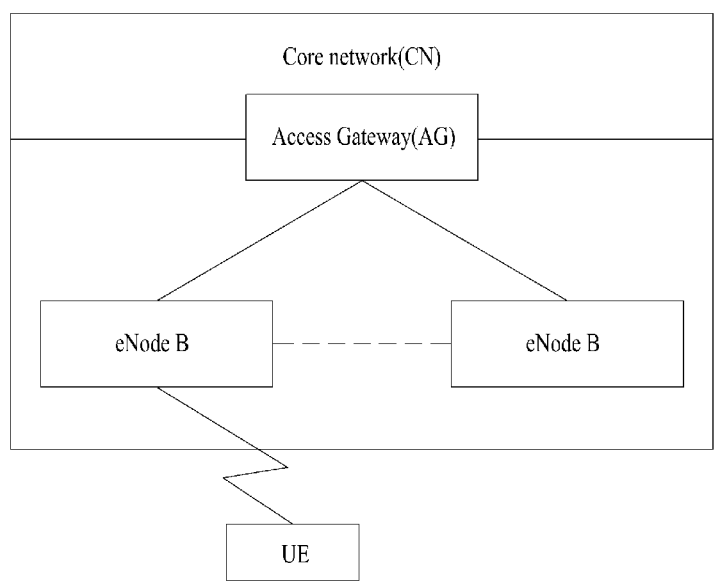
FIG. 1 is a conceptual diagram illustrating an Evolved Universal Mobile Telecommunications System (E-UMTS) network structure as an example of a wireless communication system.
Figure 2:
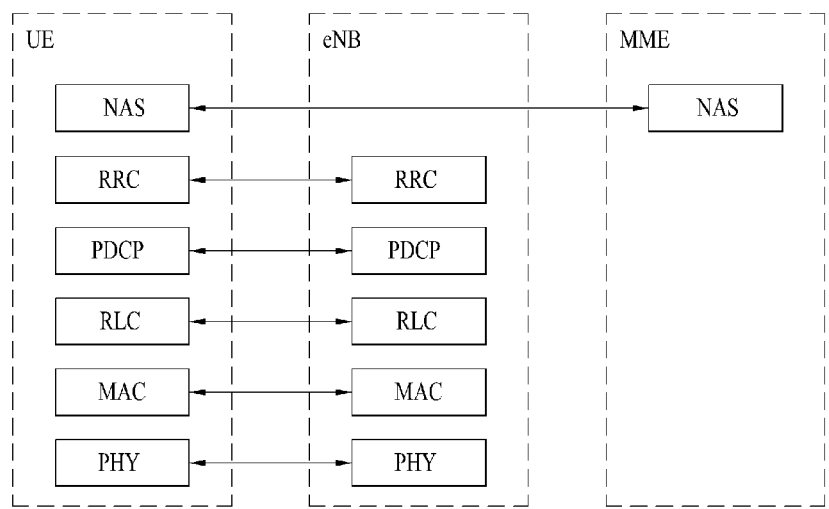
FIG. 2 illustrates a control plane and a user plane (U-Plane) of a radio interface protocol between a User Equipment (UE) and an E-UTRAN according to the 3GPP wireless access network standard.
Figure 2:
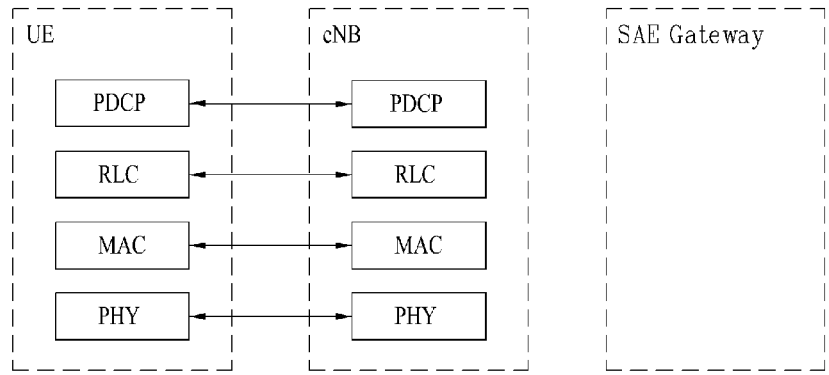

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, reconfiguration and release of Radio Bearers (RBs). The radio bearer (RB) is a service that the second layer provides for data communication between the UE and the network. To accomplish this, the RRC layer of the UE and the RRC layer of the network exchange RRC messages. The UE is in RRC connected mode if an RRC connection has been established between the RRC layer of the network and the RRC layer of the UE. Otherwise, the UE is in RRC idle mode. A Non-Access Stratum (NAS) layer located above the RRC layer performs functions such as session management and mobility management.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
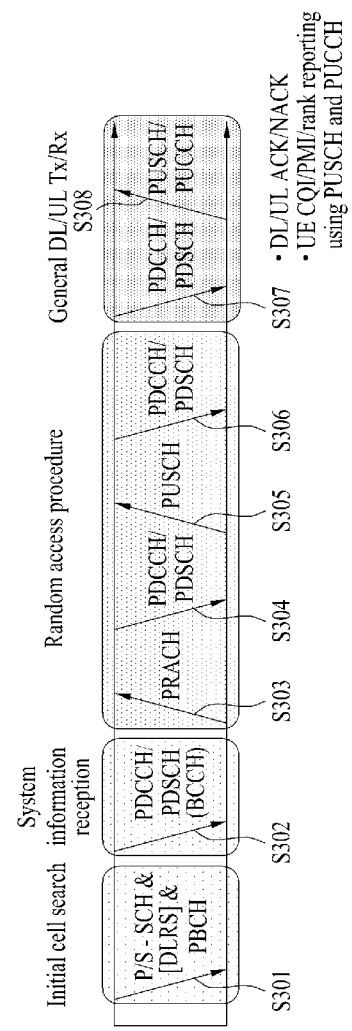
FIG. 3 is a conceptual diagram illustrating physical channels used in a 3GPP LTE system as an exemplary mobile communication system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. Specifically, the UE may receive downlink control information (DCI) through a PDCCH. In this case, DCI includes control information such as resource allocation information for the UE, and has different formats according to usage purposes.

On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
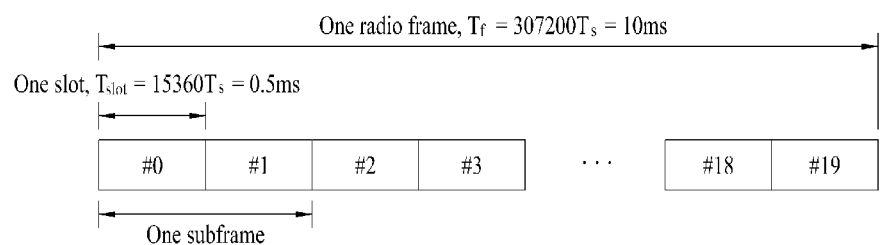
FIG. 4 is a diagram illustrating a structure of a radio frame for use in a Long Term Evolution (LTE) system.

FIG. 4 is a diagram illustrating a structure of a radio frame used in an LTE system.

Referring to FIG. 4, the radio frame has a length of 10 ms ($327200 \cdot T_s$) and includes 10 subframes of equal size. Each subframe has a length of 1 ms and includes two slots. Each slot has a length of 0.5 ms ($15360 \cdot T_s$). In this case, $T_s$ represents sampling time, and is expressed by '$T_s=1/(15 \text{ kHz} \times 2048)=3.2552 \times 10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM symbols in each slot.

Figure 5:
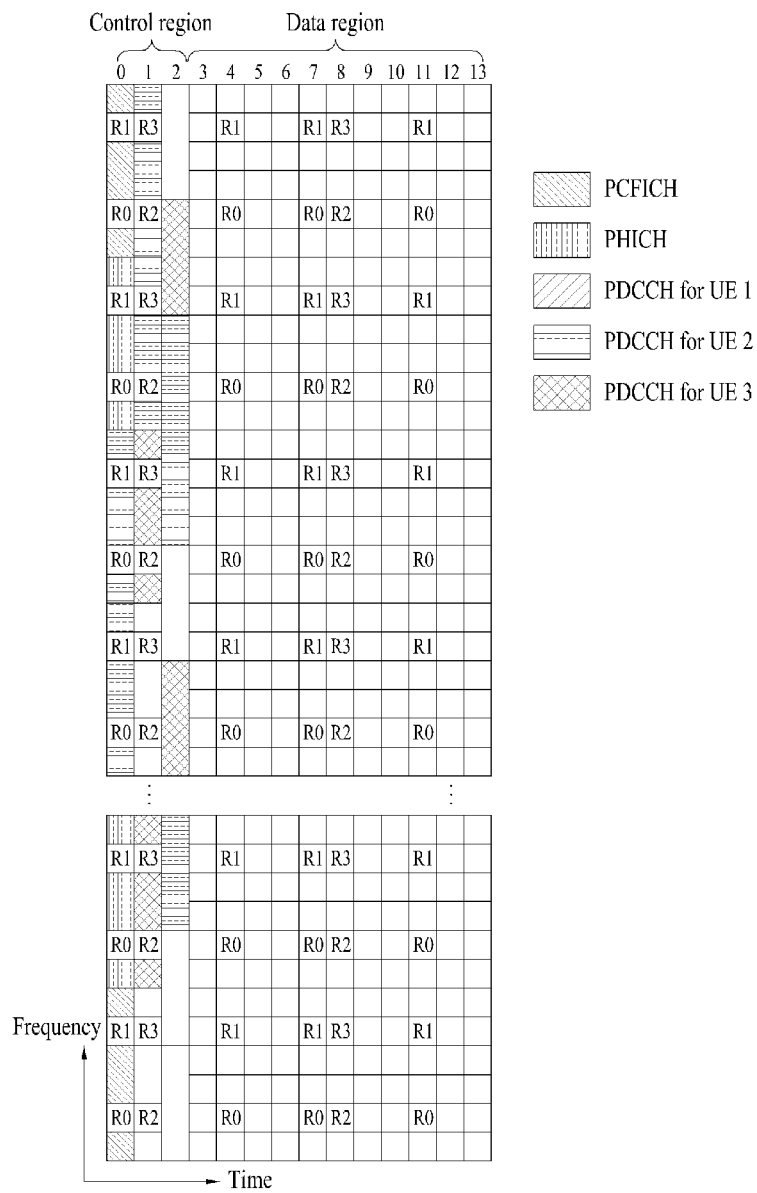
FIG. 5 is a conceptual diagram illustrating a downlink radio frame for use in an LTE system.

FIG. 5 shows a control channel contained in a control region of one subframe in a downlink radio frame according to one embodiment of the present invention.

Referring to FIG. 5, one subframe includes 14 OFDM symbols. First to third ones of the 14 OFDM symbols may be used as a control region, and the remaining OFDM symbols (i.e., 11 to 13 OFDM symbols) may be used as a data region. In FIGS. 5, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid—ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)—modulated.

PHICH is used as a physical HARQ (Hybrid—Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)—modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which UE will receive data as an input, information indicating how the UEs receive PDSCH data, and information indicating whether decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors a PDCCH using its own RNTI information. If at least one UE having the RNTI 'A' is present, the UEs receive PDCCH and receive PDSCH indicated by 'B' and 'C' through the received PDCCH information.

Figure 6:
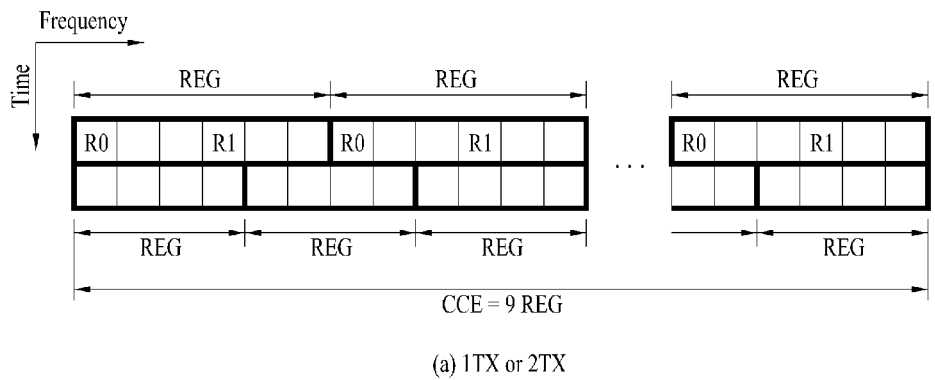
FIG. 6 shows a resource unit used when a control channel is constructed.
Figure 6:
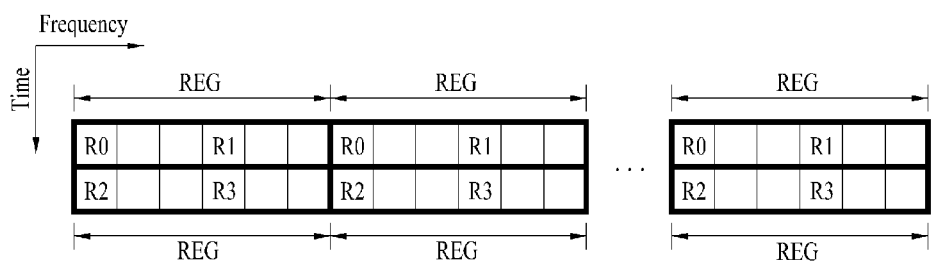

FIG. 6 is a diagram showing a resource unit used for configuring a control channel. FIG. 6(a) shows the case where the number of transmission antennas is 1 or 2 and FIG. 6(b) shows the case where the number of transmission antennas is 4, which are different from each other in only an RS pattern according to the number of transmission antennas, but are equal to each other in a method of setting a resource unit associated with the control channel Referring to FIGS. 6(a) and 6(b), the REG which is the basic resource unit of the control channel is composed of four neighbor REs in a state of excluding the RS. The REG is denoted by a thick line in the drawing. The PCFICH and the PHICH include four REGs and three REGs, respectively. The PDCCH is composed of CCE units and one CCE includes 9 REGs.

The UE is set to confirm M (L) (≥L) CCEs which are arranged consecutively or according to a specific rule in order to determine whether a PDCCH composed of L CCEs is transmitted to the UE. The value L considered when the UE receives the PDCCH may be plural. A set of CCEs which should be confirmed when the UE receives the PDCCH is referred to as a PDCCH search space. For example, in the LTE system, the PDCCH search space is defined as shown in Table 1.

TABLE 1

| | Search space $S_k^{(L)}$ | | Number | |
|---|---|---|---|---|
| Type | Aggregation level L | Size [in CCEs] | of PDCCH candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 1, CCE aggregation level (L) denotes the number of CCEs configuring the PDCCH, $S^{(L)}_k$ denotes the PDCCH search space, and $M^{(L)}$ denotes the number of PDCCH candidates to be monitored in the search space.

The PDCCH search space may be divided into a UE-specific search space in which access is allowed for only a specific UE and a common search space in which access is allowed for all UEs within a cell. The UE monitors the common search space at L=4 and 8 and monitors the UE-specific search space at L=1, 2, 4 and 8. The common search space and the UE-specific search space may overlap.

In addition, the location of a first CCE (having a smallest index) in the PDCCH search space applied to a certain UE with respect to each value L is changed according to the UEs for each subframe. This is referred to as PDCCH search space hashing.

Figure 7:
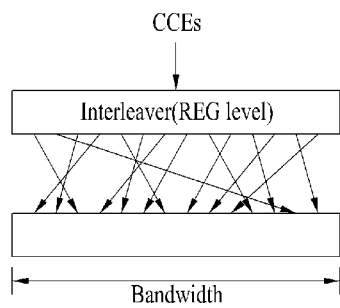
FIG. 7 shows an example for distributing CCEs to a system band.

FIG. 7 shows an exemplary CCE distribution in a system band. Referring to FIG. 7, a plurality of CCEs which are logically consecutive is input to an interleaver. The interleaver performs a function for interleaving the plurality of CCEs in REG units. Accordingly, the REGs configuring the CCE are scattered in the overall frequency/time domain within the control region of the subframe. In conclusion, the control channel is constructed in units of a CCE and interleaving is performed in units of an REG, such that frequency diversity and interference randomization gain can be maximized.

Figure 8:
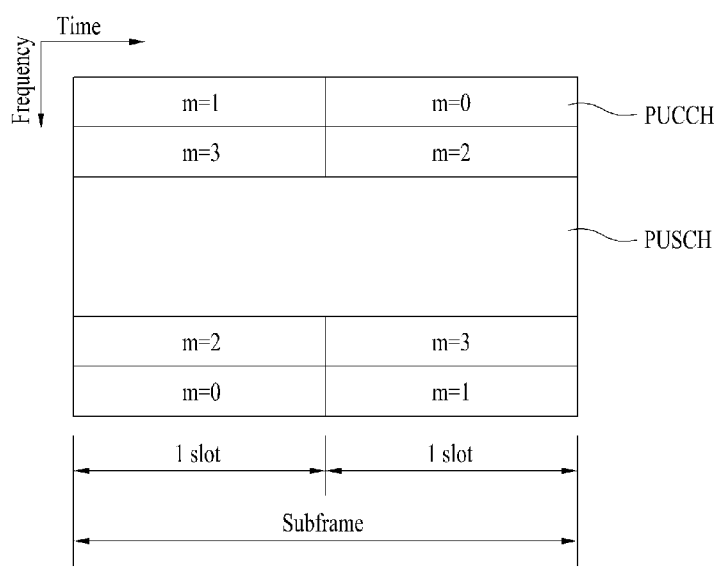
FIG. 8 shows an uplink subframe structure for use in the LTE system.

FIG. 8 illustrates an uplink (UL) subframe structure for use in an LTE system.

Referring to FIG. 6, the UL subframe may be classified into a first region to which a physical uplink control channel (PUCCH) carrying control information is allocated and a second region to which a physical uplink shared channel (PUSCH) carrying user data is allocated. The center part of the subframe is allocated to PUSCH, and both parts of the data region are allocated to PUCCH in the frequency domain Control information transmitted over PUCCH may include ACK/NACK used in HARQ, a Channel Quality Indictor (CQI) indicating a downlink channel state, a Rank Indicator (RI) for MIMO, a scheduling request (SR) acting as a UL resource allocation request, etc. PUCCH for one UE uses one resource block (RB) that occupies different frequencies in each slot of the subframe. That is, two RBs allocated to PUCCH are frequency-hopped at a boundary between slots. In particular, as can be seen from FIG. 7, FIG. 7 is a conceptual diagram illustrating a relay backhaul link and a relay access link for use in a wireless communication system. As can be seen from FIG. 7, PUCCH of m=0, PUCCH of m=1, PUCCH of m=2, and PUCCH of m=3 are allocated to the subframe.

The present invention provides an efficient HARQ scheme for dynamically changing specific radio resources (for example, downlink resource or uplink resource) allocated from the eNB to the UE such that it is determined whether the specific radio resources will be used for downlink or uplink according to traffic load variation.

First, prior to describing detailed description of the proposed schemes, uplink-downlink configuration defined in the 3GPP LTE—based TDD system will hereinafter be described in detail.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D, U and S are allocated respective subframe numbers. In more detail, D denotes a downlink subframe, U denotes an uplink subframe, and S denotes a switching point. In addition, the following Table 3 shows an uplink subframe number (index) for controlling a UE to transmit uplink ACK/NACK of the corresponding downlink signal in the 3GPP LTE system.

TABLE 3

| UL-DL Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

Specifically, in Table 3, '-' indicates configuration of an uplink subframe, and a number allocated to each subframe number indicates an uplink subframe index. That is, '-' indicates an uplink subframe index interlocking with the corresponding downlink subframe.

In order to dynamically change the use of specific legacy radio resources, that is, in order to change a specific radio resource (for example, UL resource or DL resource) allocated to the UE to another radio resource for the purpose of UL or DL purpose according to traffic load variation, additional UL/DL configuration may be indicated through UE-specific dedicated RRC signaling (for example, subframe reconfiguration message). Alternatively, the set of subframes changed from UL subframes to DL subframes and the set of subframes changed from DL subframes to UL subframes may be simultaneously indicated, or the set of subframes changed from DL subframes to UL subframes may also be indicated. In addition, for the set of subframes changed from UL subframes to DL subframes and the set of subframes changed from DL subframes to UL subframes, additional UL/DL configurations having individual usages may also be indicated.

Alternatively, a specific field of control information transmitted through a physical control channel may be (re)used (or (re)interpreted) as an indicator, such that the usage of a specific subframe may be dynamically changed. For example, the specific field may be a Carrier Indication field (CIF), a Downlink Assignment Index (DAI) or a UL index.

In this case, the above-mentioned methods are representative examples of the method for dynamically changing the usage of specific radio resources, and may perform signaling of the subframe use variation using other methods.

In addition, the eNB may inform the UE of (position) information regarding the set of specific radio resources using a bitmap or the like. The set of specific radio resources may dynamically change the use of radio resources through RRC signaling. Thereafter, the eNB may inform the UE of specific information as to whether the use of a specific radio resource set indicated through RRC signaling using a specific field (for example, CIF or DAI, or UL index) of a control channel That is, the eNB may also inform the UE of activation or deactivation of such change using the specific field of the control channel. For example, assuming that the set of UL subframes designated through RRC signaling is composed of UL subframe #a and UL subframe #b, the eNB may inform the UE of specific information as to whether the use of the set of radio resources is changed using a specific field of a 1-bit sized control channel That is, if the specific field is set to 1, this means that UL subframe #a and UL subframe #b are respectively changed to DL subframe #a and DL subframe #b. If the specific field is set to zero (0), this means that the subframe #a and the subframe #b are used for the purpose of uplink purpose for initialization.

Needless to say, specific information indicating whether the use of individual radio resources constructing the specific radio resource set is changed may be indicated through a specific field (for example, CIF or DAI, or UL index) of a control channel. For example, assuming that the set of UL subframes designated by RRC signaling is composed of UL subframe #a and UL subframe #b, it may be possible to indicate information as to whether the use of an individual radio set is changed using the 2-bit sized information. For example, if the specific field is set to 11, this means that the subframe #a and the subframe #b are used as DL subframes. If the specific field is set to 10, this means that the subframe #a is used as a DL subframe and the subframe #b is used as a UL subframe. In addition, if the specific field is set to 01, this means that the subframe #a is used as the UL subframe and the subframe #b is used as the DL subframe. If the specific field is set to 00, this means that both the subframe #a and the subframe #b are used as UL subframes for the purpose of initialization.

In addition, assuming that the UL grant is not received at SF #(n-4) in the subframe (for example, SF #n), the usage of which can be dynamically changed (for example, the use of UL resource can be changed to DL communication use), if the UL grant is not received at SF #(n-4), blind decoding (BD) is primarily performed at the corresponding subframe (for example, SF #n), such that the specific field can be detected.

In addition, the eNB may inform the UE of the set of a plurality of specific radio resources (i.e., the set of candidates) through which the use of legacy radio resources can be dynamically changed through RRC signaling, and may also inform the UE of the set of radio resources to which the use change is applied using a specific field of a control channel.

Although the following embodiments will assume the case of indicating whether a dynamic subframe is changed through UE-specific RRC signaling for convenience of description, the other case of indicating whether a dynamic subframe is changed can also be applied to the following embodiments.

Figure 9:
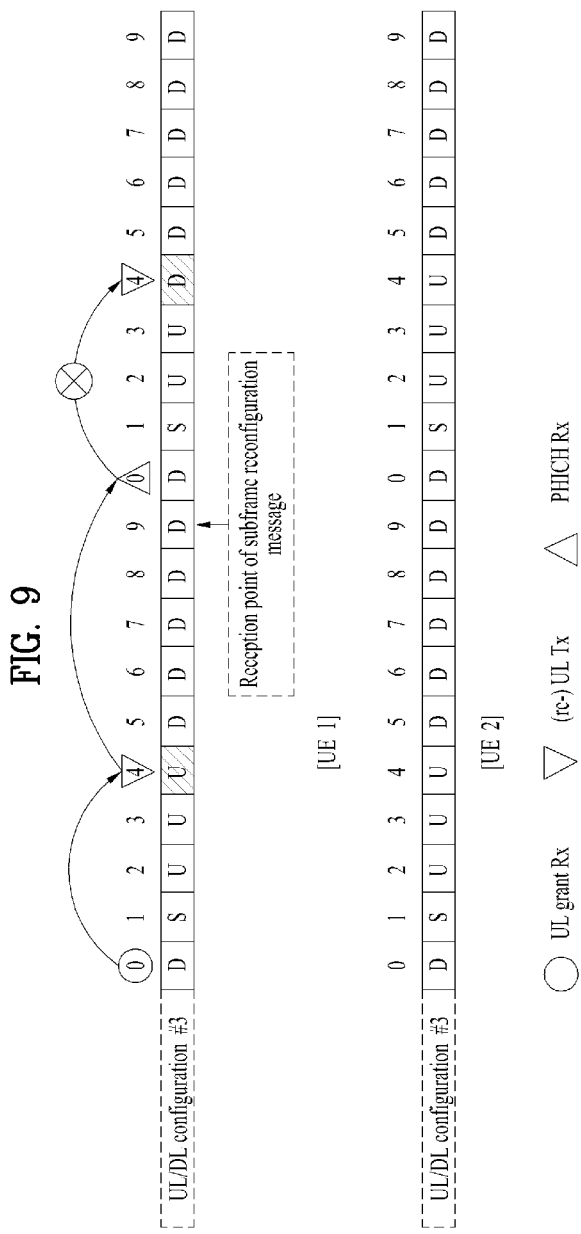
FIG. 9 shows an example of implementing a subframe dynamic change through dedicated RRC signaling in an LTE TDD system.

FIG. 9 shows an example for implementing a subframe dynamic change through dedicated RRC signaling in an LTE TDD system. Specifically, referring to FIG. 9, UE 1 and UE 2 are operated in UL/DL configuration #3, and UE 1 denotes a UE (i.e., Advanced-UE (A-UE)) for dynamically changing the use of a subframe. UE 2 denotes a UE (i.e., legacy UE) for dynamically maintaining UL/DL configuration allocated through a legacy SIB (System Information Block) without change.

Referring to FIG. 9, assuming that UE 1 receives a subframe reconfiguration message for indicating UL/DL configuration #4 at DL subframe #9, this means that the use of a legacy subframe #4 is dynamically changed from uplink use to downlink use.

However, when the use of a specific radio resource is dynamically changed according to the above-mentioned scheme, it is impossible to guarantee the HARQ process of legacy UL/DL configuration without change. For example, according to the legacy UL/DL configuration #3, when a PHICH of UL subframe #4 is received as NACK at DL subframe #0, it is impossible to retransmit UL subframe #4 as shown in FIG. 9, because the UL subframe #4 is changed to DL subframe #4. That is, it is impossible for the UL HARQ process linked to UL subframe #4 to be normally operated.

Accordingly, when the LTE TDD system uses a method for dynamically changing the use of a specific radio resource allocated from the eNB to the UE, the present invention provides a method for efficiently supporting the UL/DL HARQ operation.

<First Embodiment>

If the use of specific radio resources is dynamically changed using dedicated RRC signaling (i.e., subframe reconfiguration message), the UE starts operation from a reception time (SF #n) of the subframe reconfiguration message indicating UL/DL configuration #x, and then terminates the UL HARQ processes based on the legacy UL/DL configuration (for example, UL/DL configuration #y) incapable of guaranteeing the UL HARQ timeline using the UL/DL configuration #x.

For example, from among UL HARQ processes based on the legacy UL/DL configuration #y, UL HARQ processes associated with the legacy UL subframe #a, the use of which is dynamically changed by the UL/DL configuration #x, are terminated. For example, the legacy UL subframe #a is changed to DL subframe #a. In this case, the UE may assume that successful UL data (i.e., ACK) transmission of the terminated UL HARQ processes based on UL/DL configuration #y has been achieved, and may then report the ACK to a higher layer. For convenience of description, all UL HARQ processes instead of individual UL HARQ processes may also be terminated as necessary.

The termination operation may refer to the UE operation in which a PHICH (i.e., SF #m (where, m<n)) received before a reception time (SF #n) or a PHICH (i.e., SF #k (where, n≤k)) to be received after the reception time (SF #n) at which the UE receives a subframe reconfiguration message may not be considered as ACK or may not be decoded, such that the PHICH may be considered as ACK at all times.

In accordance with another scheme for terminating UL HARQ processes, the eNB may transmit a PHICH of the terminated UL HARQ processes to the UE.

In addition, a specific time point (SF #p) to which the additionally allocated UL/DL configuration #a and associated UL HARQ operations are actually applied may include a reception time (SF #n) at which the UE receives the subframe reconfiguration message, and begins with a first SF (SF #k) (of the first SFN) located after a specific time at which a subframe pattern length (or period) of the legacy UL/DL configuration #y is completed after SF #n. For example, assuming that the UE receives a subframe reconfiguration message indicating UL/DL configuration #4 at DL subframe #7 under the same situation as in FIG. 9, the additionally allocated UL/DL configuration #4 and associated HARQ process operation are actually applied to subframes starting from the nearest DL subframe #0 located after DL subframe #7.

Figure 10:
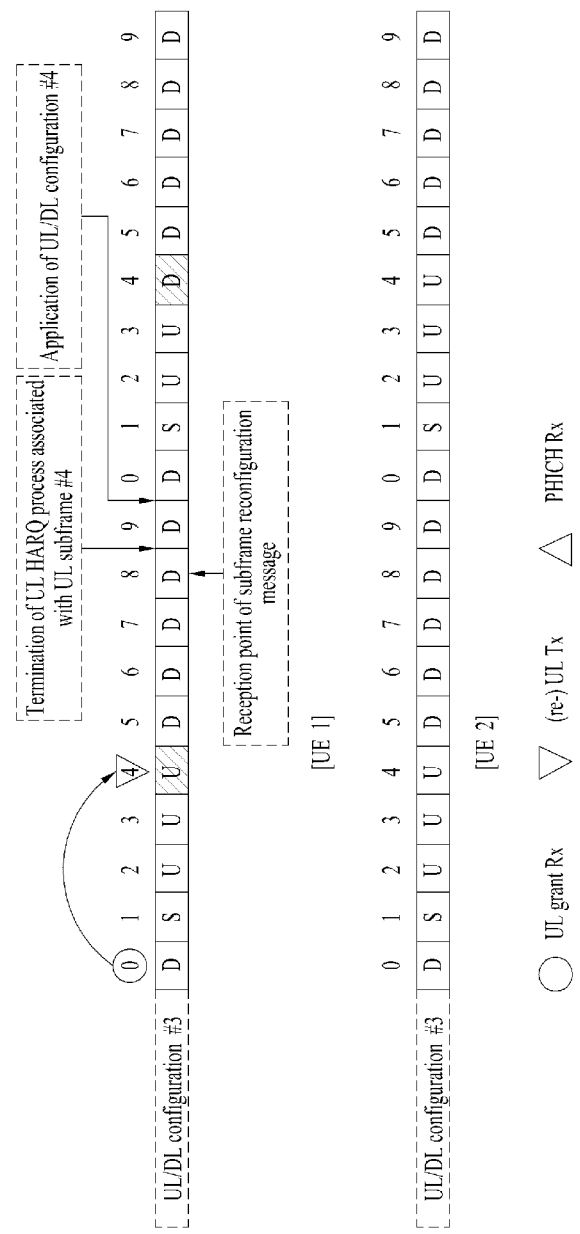
FIG. 10 shows an example of using an uplink HARQ operation according to a first embodiment.

FIG. 10 shows an example of using an uplink HARQ operation according to a first embodiment.

Referring to FIG. 10, when the subframe reconfiguration message indicating UL/DL configuration #4 is received at DL subframe #8, the UL HARQ timeline regarding the legacy UL/DL configuration #3—based UL subframe #4 cannot be guaranteed using the additionally allocated UL/DL configuration #4, such that the associated HARQ process is terminated.

In this case, the UE does not implicitly decode a PHICH (i.e., DL subframe #0) of the UL subframe #4 based on the legacy UL/DL configuration #3, and always considers the PHICH to be ACK. In addition, a specific time at which the additionally allocated UL/DL configuration #4 is actually applied may start from the nearest DL subframe #0 located after DL subframe #8 according to the above-mentioned scheme.

<Second Embodiment>

(1) When the use of specific radio resource having been allocated is dynamically changed, after a subframe reconfiguration message indicating UL/DL configuration #x is received at SF #n, the UL/DL configuration #x and a specific time (SF #p) at which the UL HARQ process operation is applied may correspond to a first subframe located after a termination time point of "repetition period of a UL subframe pattern used by one UL HARQ process" of the legacy UL/DL configuration #y. For convenience of description, "repetition period of the UL subframe pattern used by one UL HARQ process" is referred to as a repetition period.

For reference, the repetition period under the 3GPP LTE TDD system environment may be set to 70 ms at UL/DL configuration #0, 60 ms at UL/DL configuration #6, and 10 ms at UL/DL configuration #1, #2, #3, #4, or #5. Specifically, in the case of UL/DL configuration #0, the UL subframe pattern used by one UL HARQ process may include UL subframe #2 for initial UL transmission, and is repeated in the order of UL subframe #3→UL subframe #4→UL subframe #7→UL subframe #8→UL subframe #9→UL subframe #2. In this case, the repetition period is the sum of intervals among individual UL subframes, and is denoted by 70 ms (=11+11+13+11+11+13).

In accordance with another scheme, a specific time at which the additionally allocated UL/DL configuration #a and associated UL HARQ operations are actually applied may be denoted by a specific period T separately from the repetition period of the legacy UL/DL configuration #y. In this case, the above-mentioned repetition period may be repeated with a predetermined start time (for example, subframe #0 of a radio frame index #0).

After the repetition period or a separate specific period T is repeatedly applied on the assumption that the legacy UL/DL configuration #y is applied to radio frames starting from a radio frame of SFN=0, a start point (or reference point) of the above repetition period or the separate specific period T includes a specific time SF #n at which the subframe reconfiguration message is received, and may be set to a first subframe of a radio frame having the nearest first SFN located after the lapse of a time at which the repetition period or separate specific period T is completed. In this case, the SFN has an yone of integer values from 0 to 1023, 1024 radio frames have a length of 10240 ms, and the SFN is repeated at intervals of the length 10240 ms.

For example, on the assumption that the UE receives the subframe reconfiguration message indicating UL/DL configuration #4 at DL subframe #6 under the same situation as in FIG. 9, a start point of the repetition period of the legacy UL/DL configuration #3 according to the above-mentioned method is set to DL subframe #0 located at the nearest position before the position of DL subframe #6. Therefore, a specific time at which the additionally allocated DL/UL configuration #4 and associated UL HARQ process operation are applied is set to DL subframe #0 located at the nearest position after the position of DL subframe #6.

Figure 11:
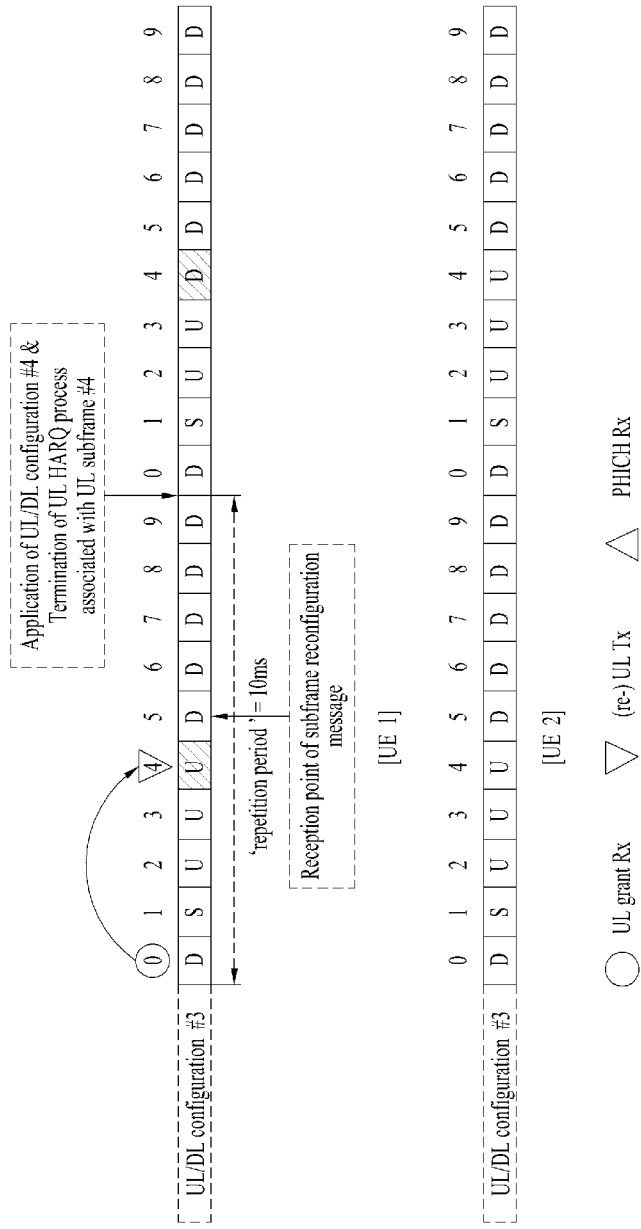
FIG. 11 shows an example of using an uplink HARQ operation according to a second embodiment.

FIG. 11 shows an example of using an uplink HARQ operation according to a second embodiment. Specifically, the subframe reconfiguration message is received at DL subframe #5 as shown in FIG. 11, differently from FIG. 10.

Referring to FIG. 11, the repetition period of the legacy UL/DL configuration #3 is set to 10 ms, and a completion time of the corresponding repetition period according to the above scheme is set to #9. Therefore, although the subframe reconfiguration message indicating UL/DL configuration #4 is received at DL subframe #5, a specific time at which the additionally allocated UL/DL configuration #4 and associated UL HARQ process operation are applied may be set to DL subframe #0 located at the nearest position after the position of DL subframe #5.

In addition, it is impossible to guarantee a UL HARQ timeline of UL subframe #4 based on the legacy UL/DL configuration #3 using the additionally allocated UL/DL configuration #4, and the uplink HARQ process is terminated according to the proposed scheme. In this case, the UE does not implicitly decode a PHICH (i.e., DL subframe #0) of UL subframe #4 based on the legacy UL/DL configuration #3, and always considers the PHICH as an ACK.

(2) In another scheme, in order to allow the eNB to inform the UE of a specific time (SF #p) at which the additionally allocated UL/DL configuration #x and associated UL HARQ process operation are applied, the eNB may inform the UE of additional signaling information including not only a subframe reconfiguration message indicating UL/DL configuration #x but also activation time (G) information through higher layer signaling. In this case, the UE, that has received the additional signaling information including the subframe reconfiguration message and the activation time (G) information at SF #n, may apply the additionally allocated UL/DL configuration #x and associated UL HARQ process operation at a time starting from SF #(n+G+1).

For example, assuming that the UE receives additional higher layer signaling including not only a subframe reconfiguration message indicating UL/DL configuration #4 but also the activation time G of 3 at DL subframe #6 under the same situation of FIG. 9, a specific time (located at the nearest position after DL subframe #6) to which UL/DL configuration #4 and associated UL HARQ process are actually applied may start from DL subframe #0.

On the contrary, according to a second embodiment, after completion of the legacy UL/DL configuration #y—based UL HARQ processes incapable of guaranteeing UL HARQ timeline using the additionally allocated UL/DL configuration #x, a new HARQ process operation can be carried out.

For example, UL HARQ processes associated with the subframe #a (for example, legacy UL subframe #a is changed to DL subframe #a), the use of which is changed from uplink to downlink by UL/DL configuration #x from among the legacy UL/DL configuration #y—based UL HARQ processes, are terminated. In this case, the UE assumes that UL data (i.e., ACK) is successfully transmitted in association with the terminated UL HARQ processes based on UL/DL configuration #y, such that it may report the ACK to a higher layer. Alternatively, for convenience of description, the above operations are not terminated per UL HARQ process, and all UL HARQ processes may be terminated.

The termination operation may refer to the UE operation in which a PHICH (i.e., SF #i (where, i<p)) received before a first SF (SF #p) or a PHICH (i.e., SF #i (where, p≤j)) to be received after the first SF (SF #p) at which a repetition period of the legacy UL/DL configuration #y or a separately-established specific period T is completed, may not be considered as ACK or may not be decoded, such that the PHICH may be considered ACK at all times.

In addition, in accordance with still another scheme in which the legacy UL/DL configuration #y—based UL HARQ processes incapable of guaranteeing UL HARQ timeline using UL/DL configuration #x are terminated, the eNB may transmit a PHICH regarding the corresponding terminated UL HARQ processes as ACK.

In accordance with the above-mentioned first and second embodiments, the UE may always consider a PHICH of the terminated UL HARQ processes as ACK. Therefore, a PHICH of the legacy UL/DL configuration #y—based UL HARQ processes incapable of guaranteeing UL HARQ timeline may not be implicitly decoded using UL/DL configuration #x being additionally allocated by the subframe reconfiguration message.

In addition, the eNB may inform the UE of not only additional 1-bit RRC signaling information for activating or deactivating a PHICH decoding operation (of the terminated UL HARQ processes) but also the subframe reconfiguration message, or may independently inform the UE of each of the additional 1-bit RRC signaling information and the subframe reconfiguration message, such that the same operation can be implemented by the eNB and the UE. In this case, the UE may limit the application range of PHICH decoding deactivation or activation signaling received from the eNB through RRC signaling to the terminated UL HARQ processes based on the legacy UL/DL configuration #y. For example, the UE having received PHICH decoding deactivation signaling considers successful UL data transmission, and may perform UL retransmission according to whether a New Data Indication (NDI) value contained in DL control information is toggled.

<Third Embodiment>

In accordance with the third embodiment, in order to dynamically change the use of specific conventionally allocated radio resources, the eNB may inform the UE of a subframe pattern (i.e., UL/DL configuration combination) composed of N UL/DL subframe configurations (where N≥1 or N>1) through dedicated RRC signaling (i.e., a subframe reconfiguration message), and the UE having received the above information is operated by repeated application of the UL/DL subframe configuration combination. In this case, the UE and eNB may (implicitly) assume that the length (i.e., a pattern length (T_p)) of UL/DL configuration combination is denoted by 10*N (ms).

Figure 12:
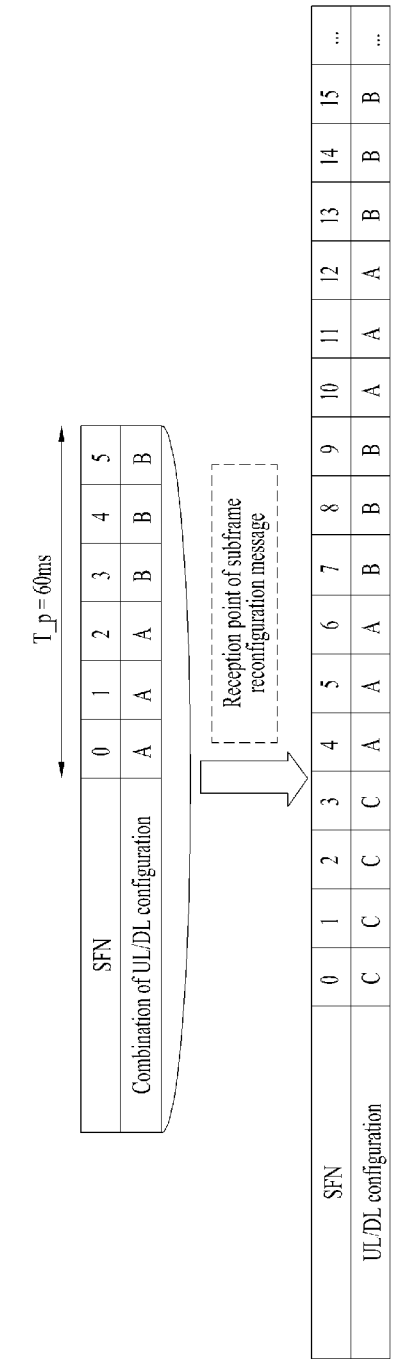
FIG. 12 shows an example of dynamically changing UL/DL configuration according to a third embodiment.

FIG. 12 shows an example for dynamically changing UL/DL configuration according to a third embodiment. For convenience of description, the legacy UL/DL configuration #y of FIG. 12 is denoted by C.

Referring to FIG. 12, the eNB may inform the UE of UL/DL configuration combination (AAABBB) composed of 6 UL/DL configurations through a reconfiguration message (based on higher layer signaling), and the UE having received the above information is operated by implicitly repeating the UL/DL configuration combination (AAABBB) at intervals of 60 ms.

In another scheme, the eNB may explicitly inform the UE of the UL/DL configuration combination and the pattern length (T_p) thereof through dedicated RRC signaling. For example, the eNB may inform the UE of information on the pattern length (T_p) of the UL/DL configuration combination. In this case, the pattern length (T_p) is divided by 10, and the divided value is converted into a binary value. The UE having the above information may consider the resultant value to be the pattern length (T_p) of the UL/DL configuration combination. In this case, if the corresponding information is converted into a decimal number and the decimal number is multiplied by 10, the resultant value can be obtained.

A specific time (SF #p) to which a UL/DL configuration combination and associated UL HARQ process operation are applied may include a specific time (SF #n) at which the subframe reconfiguration message is received, after the UL/DL configuration combination starting from the radio frame of SFN=0 is repeated applied during the time (T_p), and may begin with a first subframe of a radio frame having a first SFN located after the earliest time at which T_p is completed.

In accordance with another scheme, a specific time (SF #9) at which a UL/DL configuration combination and associated UL HARQ process operation are applied may include a time (SF #n) at which the subframe reconfiguration message is received, after the legacy UL/DL configuration #y is repeatedly applied to radio frames starting from a radio frame of SFN=0 on the basis of the repetition period or (predetermined) specific period T, and may begin with a first subframe of a radio frame having a first SFN located after the earliest time at which the repetition period or (predefined) specific period T is completed.

In accordance with another scheme, a specific time (SF #p) to which UL/DL configuration combination and associated UL HARQ process operations are applied, may include a specific time (SF #n) at which the subframe reconfiguration message is received, and may begin with a first subframe #k (of a radio frame having a first SFN) located after the earliest time at which the SF pattern period (for example, 10 ms) of the legacy UL/DL configuration #y is completed. For example, assuming that the UE receives the subframe reconfiguration message at DL subframe #8 under the same situation as in FIG. 9, a specific time at which UL/DL configuration combination and associated UL HARQ process operation are applied may start from DL subframe #0 located at the nearest position located after the position of the DL subframe #8.

In addition, in order to allow the eNB to inform the UE of a specific time (SF #p) at which the UL/DL configuration combination and associated UL HARQ process operation are applied, the eNB may inform the UE of additional signaling information including not only UL/DL configuration information but also activation time (G) information through higher layer signaling. In this case, the UE, that has received the additional signaling information including UL/DL configuration information and activation time (G) information at SF #n, may apply the additionally allocated UL/DL configuration #x and associated UL HARQ process operation at a time starting from SF #(n+G+1).

For example, assuming that the UE receives additional higher layer signaling including not only UL/DL configuration combination but also the activation time of G=1 at DL subframe #8 under the same situation of FIG. 9, a specific time (located at the nearest position after DL subframe #8) to which the UL/DL configuration combination and associated UL HARQ process are actually applied may start from DL subframe #0.

In addition, if a current combination is changed to UL/DL configuration combination at the legacy UL/DL configuration #y, or if UL/DL configuration change occurs within the UL/DL configuration combination, the legacy UL/DL configuration—based UL HARQ processes incapable of guaranteeing UL HARQ timeline are terminated using the changed UL/DL configuration. In this case, the UE may assume that successful UL data (i.e., ACK) transmission of the terminated UL HARQ processes based on UL/DL configuration has been achieved, and may then report the ACK to a higher layer. For convenience of description, all UL HARQ processes instead of individual UL HARQ processes may also be terminated as necessary.

In the same manner as in the first and second embodiments, on the basis of a specific time (SF #p) at which the changed UL/DL configuration and associated UL HARQ process are actually applied, or on the basis of another specific time (SF #n) at which the subframe reconfiguration message is received, the termination operation may consider a PHICH (i.e., SF #i, where i<p or i<n) received before the above specific time or a PHICH (i.e., SF #j, where p≤j or n≤j)) to be received after the above specific time as an ACK or may not decode the PHICH, and may always consider the PHICH to be the ACK. Specifically, the termination operation performed when the UL/DL configuration change occurs within UL/DL configuration combination may not consider a PHICH (i.e., SF #i, where i<f) received before a specific time at which UL/DL configuration change occurs, or a PHICH (i.e., SF #j, where f≤j) to be received after the specific time to be an ACK, or may not decode the PHICH, and may always consider the PHICH to be the ACK.

In this way, a third embodiment may also control the eNB to transmit a PHICH of the corresponding terminated UL HARQ process as an ACK according to another scheme in which the legacy UL/DL configuration—based UL HARQ processes incapable of guaranteeing the UL HARQ timeline are terminated using the changed UL/DL configuration.

<Fourth Embodiment>

In accordance with the fourth embodiment, when the use of a specific radio resource allocated from the eNB to the UE is dynamically changed in the TDD system, the fourth embodiment proposes a method for controlling the UE to efficiently transmit UL ACK/NACK. That is, the fourth embodiment proposes a UL ACK/NACK transmission timeline. For convenience of description, the legacy UL/DL configuration is defined as UL/DL configuration #y, and UL/DL configuration additionally allocated by the subframe reconfiguration message is defined as UL/DL configuration #x.

In addition, the following UL ACK/NACK transmission timeline can be applied to all of the above-mentioned embodiments, and may be shared with higher layer signaling or the like before the above-mentioned embodiments are applied between the eNB and the UE. Alternatively, the UL ACK/NACK transmission timeline may be implicitly recognized between the eNB and the UE according to application or non-application of the above-mentioned embodiments.

A-1) If UL SF #n acting as a UL resource is changed to a DL resource (for example, DL SF #n), UL ACK/NACK of the legacy (UL/DL configuration based) DL resources interlocked to transmit the UL ACK/NACK through UL SF #n may be transmitted at the nearest available UL SF satisfying UL SF #(n+p) (where, p≥1, p is an integer).

In this case, "available UL SF" may denote i) a UL SF to be used for transmission of the legacy UL ACK/NACK transmission, or may denote ii) all UL SFs configured by UL-DL configuration.

A-2) In addition, from among UL subframes #i (where i<z) located before a specific time (SF #z) at which the additionally allocated UL/DL configuration #x and associated UL HARQ process operation are actually applied, UL ACK/NACK of the remaining DL subframes other than DL subframes interlocked with UL SF #n of the above case A-1 may be based on UL ACK/NACK timeline of the legacy UL/DL configuration #y. In addition, UL ACK/NACK of DL subframe #j (where j≥z) located after a specific time (SF #z) at which UL/DL configuration #x and associated UL HARQ process operation are actually applied may be based on UL ACK/NACK of UL/DL configuration #x.

A-3) UL ACK/NACK of DL subframes interlocked to transmit UL ACK/NACK through UL subframe #h (where h≥z) located after a specific time (SF #z) to which the additionally allocated UL/DL configuration #x and associated UL HARQ process operation are actually applied may be based on UL ACK/NACK timeline of UL/DL configuration #x. In this case, DL subframes may include DL subframes interlocked with UL SF #n of the above case A-1. Furthermore, UL ACK/NACK of DL subframes interlocked to transmit UL ACK/NACK through UL subframe #t (where t<z) located before a specific time (SF #z) to which UL/DL configuration #x and associated UL HARQ process operation are actually applied may be based on UL ACK/NACK timeline of the legacy UL/DL configuration #y. In another scheme, DL subframes interlocked with UL SF #n may be limited to exceptionally satisfy the above scheme A-1 as necessary.

B-1) If UL resource (i.e., UL subframe #n) is changed to DL resource (i.e., DL subframe #n), UL ACK/NACK of DL subframe #n may be transmitted through (the nearest) available UL SF satisfying UL subframe #(n+k) (where k≥4, k is an integer). Likewise, "available UL SF" may denote i) a UL SF to be used for legacy UL ACK/NACK transmission, or may denote ii) all UL SFs configured by UL-DL configuration.

B-2) Alternatively, UL ACK/NACK of DL subframe #n (generated by the changed use of UL subframe #n) may also follow UL ACK/NACK timeline of the additionally allocated UL/DL configuration #x.

C) If UL resource (i.e., UL subframe #n) is changed to DL resource (i.e., DL subframe #n), UL ACK/NACK of DL subframe #n may be configured to satisfy UL ACK/NACK transmission timing of UL-DL configuration satisfying all or some of the following specific conditions within the scope of a total candidate aggregation (i.e., UL/DL configurations #0~#6 of Table 2) capable of being designated by UL/DL configuration.

In this case, examples of the specific condition may be configured to satisfy UL ACK/NACK timeline of the following UL-DL configurations (1), (2), and (3). In more detail, the UL-DL configuration (1) is a UL-DL configuration in which the corresponding UL SF #n is allocated as DL SF #n. The UL-DL configuration (2) is a UL-DL configuration for guaranteeing the fastest UL ACK/NACK transmission timeline satisfying UL subframe #m (where, m≥(n+4)), and the UL-DL configuration (3) allows candidate UL subframes configured by UL subframe #m (where, m≥(n+4)) to satisfy conditions limited to a subset of the UL subframe set allocated by UL/DL configuration #x.

In addition, according to the above-mentioned scheme (C), if UL resource (i.e., UL subframe #n) is changed to DL resource (i.e., DL subframe #n), the scheme (C) may be used to establish each (or all) UL ACK/NACK timeline(s) of the legacy UL/DL configuration #y—based DL subframes interlocked to transmit UL ACK/NACK through UL subframe #n.

<Fifth Embodiment>

X) UL/DL configuration #x additionally allocated through dedicated RRC signaling (i.e., subframe reconfiguration message) may be used for one purpose for dynamically changing the use of specific radio resources of the legacy UL/DL configuration #y designated as SIB, or may also be used for the other purpose (for example, measurement purpose such as RSRQ, RSRP or RLM, or HARQ timeline) of the legacy UL/DL configuration #y.

For example, only a specific part from among the HARQ operation of UL/DL configuration #y designated as SIB may be operated according to UL/DL configuration #x different from that of the HARQ timeline defined in the legacy UL/DL configuration #y. That is, all or some parts of the relationship between a reception time of a UL grant and PHICH of the legacy UL/DL configuration #y and a PUSCH transmission time, the relationship between a PUSCH transmission time and a PHICH reading time, and the relationship between a PDSCH reception time and a UL ACK/NACK transmission time may be operated according to the additionally allocated UL/DL configuration #x.

In another scheme, the above operation may be achieved according to only UL-DL configuration #y designated as legacy SIB for measurement usage such as RSRQ, RSRP, or RLM. For example, the measurement process may be performed only under a DL SF based on the legacy UL-DL configuration #y. In another example, during the measurement process, a common DL subframe between the legacy UL/DL configuration #y (designated as SIB) and the additionally allocated UL/DL configuration #x may be used as necessary.

Y) In another example, when individual component carriers (CCs) are configured to use different UL/DL configurations under the carrier aggregation (CA) environment and cross carrier scheduling (CCS) of a secondary component carrier (SCell) is performed at PCell, the UL/DL configuration #x additionally allocated through dedicated RRC signaling may be used for a specific purpose only (for example, measurement such as RSRQ, RSRP, or RLM, or HARQ timeline) from among the legacy UL/DL configuration operation per CC.

That is, only a specific part of the HARQ operation of the legacy per-CC UL/DL configuration may satisfy the HARQ timeline defined in the legacy per-CC UL/DL configuration and other UL/DL configuration #x. For example, all or some parts of the relationship between a reception time of UL grant and PHICH of the legacy per-CC UL/DL configuration and a PUSCH transmission time, the relationship between a PUSCH transmission time and a PHICH reading time, and the relationship between a PDSCH reception time and a UL ACK/NACK transmission time may be operated according to the additionally allocated UL/DL configuration #x.

In addition, a total number of additionally allocated UL/DL configurations #x may be set to 1 (that is, if all component carriers use a single specific common UL/DL configuration that is additionally allocated), may be set to a total number of secondary component carriers (that is, if SCell separately uses different UL/DL configurations having been allocated several times corresponding to a total number of SCells through dedicated RRC signaling), or may also be set to a total number of component carriers (that is, if all component carriers individually use different UL/DL configurations having been allocated several times corresponding to a total number of component carriers through dedicated RRC signaling).

<Sixth Embodiment>

The sixth embodiment provides an ACK/NACK transmission method for controlling a UE to efficiently transmit UL ACK/NACK when the use of specific radio resources allocated from the eNB to the UE is dynamically changed in the TDD system. For convenience of description in the following, the legacy UL/DL configuration is defined as UL/DL configuration #y, and UL/DL configuration additionally allocated by the subframe reconfiguration message is defined as UL/DL configuration #x. Likewise, the following ACK/NACK transmission method of the UE can be applied to all of the above-mentioned embodiments.

If a specific radio resource is dynamically changed for DL or UL purpose, the UE may implicitly change the legacy ACK/NACK transmission scheme notified through a higher layer according to a variation of the number of DL subframes interlocked with UL subframe. As a result, before a specific time (SF #z) at which the additionally allocated UL/DL configuration #x is actually applied, UL ACK/NACK transmission of a DL subframe operated by UL ACK/NACK timeline based on another UL/DL configuration but not UL ACK/NACK timeline of UL/DL configuration #x can be guaranteed.

For example, when UL subframe #n is changed to DL subframe #n, UL ACK/NACK transmission of the legacy UL/DL configuration #y—based DL subframes interlocked to transmit UL ACK/NACK through UL subframe #n can be guaranteed. In this case, the changed ACK/NACK transmission scheme may be applied only to UL subframe #g of a specific time for which the changed ACK/NACK transmission scheme is needed, may always be applied to ACK/NACK transmission at a subsequent UL subframe #m (where m≥g) including UL subframe #g. In addition, the UE may first follow the legacy ACK/NACK transmission scheme within the range of a maximum number of DL subframes interlocked with UL subframes supporting the legacy ACK/NACK transmission scheme.

In more detail, the eNB may recognize whether the UE will be operated according to the legacy ACK/NACK transmission scheme or other schemes, on the basis of "used or non-used state" and "application position" of the above-mentioned embodiments. In this case, the used change rule may be exemplarily defined as "PUCCH format 1a/1b→channel selection scheme→PUCCH format 3", "PUCCH format 1a/1b→channel selection scheme→ACK/NACK bundling", or "PUCCH format 1a/1b→channel selection scheme or ACK/NACK bundling or PUCCH format 3".

In this case, since ACK/NACK resources of PUCCH format 3 are decided through higher layer signaling, the eNB may preallocate the ACK/NACK resource for PUCCH format 3 to the UE on the condition that there is a high probability of employing PUCCH format 3 when the above proposed schemes are applied under a specific UL-DL configuration.

In accordance with the rule for changing the ACK/NACK transmission scheme to be used by UE, rules for changing multiple ACK/NACK transmission schemes may be preconfigured and shared between the eNB and the UE before the above-mentioned embodiments are used, and the eNB may inform the UE of signaling information of bit information corresponding to a specific rule through higher layer signaling. Alternatively, after only one rule of changing the ACK/NACK transmission scheme is shared between the eNB and the UE, the eNB may inform the UE of higher layer signaling activating this rule. Alternatively, after one rule is shared between the eNB and the UE, the eNB may inform the UE of higher layer signaling (for example, 1-bit higher layer signaling) for activating this rule.

Alternatively, the above-mentioned scheme may be changed only to one specific ACK/NACK transmission scheme under the condition that the legacy ACK/NACK transmission scheme must be changed. For example, PUCCH format 3 is established according to one specific ACK/NACK transmission scheme, and the eNB may inform the UE of the corresponding ACK/NACK resources through higher layer signaling.

<Seventh Embodiment>

A specific subframe (for example, SF #e) may be used as a UL subframe in the legacy UL/DL configuration #y designated by SIB, and may be used as a DL subframe on the additionally allocated UL/DL configuration #x. In this case, although the corresponding SF #e is used as a DL subframe according to UL/DL configuration #x, a control channel such as PDCCH may not be transmitted at SF #e.

In this case, the eNB may perform PDSCH mapping starting from a first symbol at SF #e at which a control channel such as PDCCH is not transmitted, or the eNB may pre-inform the UE of the position of a specific start symbol through higher layer signaling or a predetermined scheme, such that the eNB may perform PDSCH mapping. In addition, similar to a start symbol associated with PDSCH mapping, if the position of a mapping termination symbol of PDSCH is ended before the last symbol (for example, it may be impossible for the last symbol to be used for the purpose of Tx-Rx switching of the eNB or UE or for the (aperiodic or periodic) SRS transmission purpose of the UE), the position of the termination symbol may be shared between the eNB and the UE through higher layer signaling (or physical layer signaling) or the predetermined scheme.

In addition, assuming that UL subframe #n is changed to DL subframe #n, all CRSs (for example, CRS located in both the control region and the data region) may not be transmitted within DL subframe #n, or CRS (for example, CRS located only in data (or control) region) of a specific region may not be transmitted. Alternatively, PDCCH may not be transmitted from the eNB. In another scheme, assuming that UL subframe #n is changed to DL subframe #n, a specific rule in which DL subframe #n is operated as an MBSFN subframe may be shared and established between the eNB and the UE. In still another scheme, assuming that UL subframe #n is changed to DL subframe #n, the eNB may inform the UE of specific information indicating that DL subframe #n is operated as an MBSFN subframe through additional signaling (i.e., a specific field (e.g., CIF or DAI, or UL index) of a physical control channel or higher layer signaling). The above characteristics can be applied to the above-mentioned embodiments.

In addition, assuming that UL subframe #n is changed to DL subframe #n, the last one or more symbols of the corresponding DL subframe #n may not be used for PDSCH transmission. For example, the purpose of Tx-Rx switching between the eNB and the UE or the (aperiodic or periodic) SRS transmission purpose of a UE may be used as an example. In addition, before UL subframe #n is changed to DL subframe #n, the UL subframe #n may be set to UL subframe contained in cell-specific SRS (or UE-specific SRS) configuration information. In this case, the number (or the position of mapping termination symbol) of symbols incapable of being used for PDSCH information mapping from among symbols of DL subframe #n may be shared (in advance) between the eNB and the UE through either higher layer signaling (or physical layer signaling) or the predetermined scheme.

In accordance with the above-mentioned embodiments, the eNB may inform the UE of additional UL/DL configuration #x through dedicated RRC signaling, such that the eNB may decide a predetermined rule in a manner that the eNB can be used only for a specific purpose (for example, measurement purpose such as RSRQ, RSRP or RLM, or HARQ timeline) of the operation of legacy UL/DL configuration #y designated as SIB.

For example, only a specific part from among the HARQ operation of UL/DL configuration #y designated as SIB may be operated according to UL/DL configuration #x different from that of the HARQ timeline defined in the legacy UL/DL configuration #y. That is, all or some parts of the relationship between a reception time of a UL grant and PHICH of the legacy UL/DL configuration #y and a PUSCH transmission time, the relationship between a PUSCH transmission time and a PHICH reading time, and the relationship between a PDSCH reception time and a UL ACK/NACK transmission time may be operated according to the additionally allocated UL/DL configuration #x.

The above-mentioned embodiments may be used for UEs located at a cell edge receiving interference under the condition that UL/DL configuration between contiguous cells is different. In addition, the concept of the present invention may be extended to the carrier aggregation (CA) scheme (i.e., in-band CA scheme or out-band CA scheme).

The concept of the present invention can be extended to the case in which carrier aggregation (CA) is applied. For example, the above concept of the present invention can also be applied to the case in which a specific CC may be commonly applied to a plurality of cells and the usage of the corresponding CC is independently established per cell. In addition, the above embodiments can also be applied to the case in which the usage of a specific legacy radio resource of a Secondary CC (SCC) is changed to another usage using Cross Carrier Scheduling (CCS) at a Primary CC (PCC).

The concept of the present invention can also be extended to the case in which PDCCH or E-PDCCH based communication is performed. In addition, assuming that the extension carrier is used for additional communication, the concept of the present invention can be applied to the case in which the usage of radio resources of the corresponding extension carrier is established, and can also be applied to the other case in which the inter-cell interference reduction coordinated operation is designed to share the extension carrier.

If it is impossible to perform UL/DL communication at a position of a specific resource (time/frequency) for various reasons, the concept of the present invention can be extended to a method for solving the HARQ (or CSI reporting) problem. For example, assuming that an Almost Blank Subframe (ABS) is used to solve the inter-cell interference problem encountered in communication between the receiver and the transmitter, if UL-DL configurations of respective component carriers (CCs) used for communication between the transmitter and the receiver are different from each other, and if ABS configurations of respective CCs used for communication between the receiver and the transmitter are different from each other, the above-mentioned embodiments can be applied to the case in which (time/frequency) resources valid for communication between the receiver and the transmitter are not established (more specifically, in the case of communication between the eNB and the relay node, or communication between the relay node and the UE), or can also be applied to the other case in which the usage of (predefined) specific resource of each CC used for communication between the receiver and the transmitter is (dynamically) changed according to a system load state.

The proposed schemes may perform D2D (Device-to-Device) communication at a specific band allocated for communication usage under the D2D communication environment, or may change the usage of (cell) specific predefined radio resource such that the above schemes can be extended to the case of reusing D2D communication.

Figure 13:
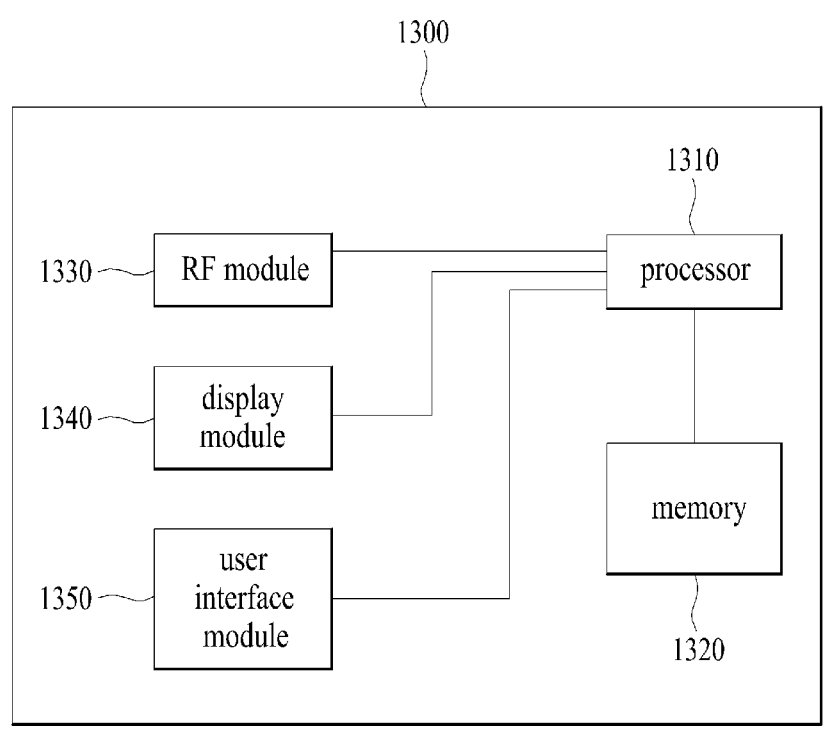
FIG. 13 is a block diagram illustrating a communication device according to embodiments of the present invention.

FIG. 13 is a block diagram illustrating a communication device according to embodiments of the present invention.

In FIG. 13, the communication device 1300 includes a processor 1310, a memory 1320, a Radio Frequency (RF) module 1330, a display module 1340, and a user interface (UI) module 1350.

The communication device 1300 is disclosed for illustrative purposes only and certain modules may also be omitted from the communication device 1300 as necessary. In addition, the communication device 1300 may further include necessary modules. Some modules of the communication device 1300 may be identified as more detailed modules. The processor 1310 is configured to carry out the operations of the embodiments of the present invention. For detailed operations of the processor 1310 reference may be made to FIGS. 1 to 12.

The memory 1320 is connected to the processor 1310, and stores an operating system, applications, program code, data and the like. The RF module 1330 is connected to the processor 1310 and converts a baseband signal into a radio frequency (RF) signal, or converts the RF signal into the baseband signal. For these operations, the RF module 1330 performs analog conversion, amplification, filtering, and frequency up-conversion in order or performs such operations in reverse order. The display module 1340 is connected to the processor 1310 and displays a variety of information. The scope or spirit of the display module 1340 of the present invention is not limited thereto, and the display module 1340 may be any of well-known elements, for example, a Liquid Crystal Display (LCD), a Light Emitting Diode (LED), an Organic Light Emitting Diode (OLED) and the like. The user interface (UI) module 1350 is connected to the processor 1310, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

As is apparent from the above description, although the retransmission method and apparatus for configuring a dynamic subframe in a wireless communication system have been disclosed on the basis of application to 3GPP LTE, the inventive concept of the present invention is applicable not only to 3GPP LTE, but also to other mobile communication systems.

The invention claimed is:

1. A method for determining an uplink-downlink configuration by a user equipment in a wireless communication system, the method comprising:
    monitoring a physical downlink control channel (PDCCH) related to reconfiguring a TDD (Time Division Duplex) uplink-downlink configuration on a specific subframe; and
    determining a reconfigured uplink-downlink configuration based on the PDCCH related to reconfiguring the TDD uplink-downlink configuration, based on whether the PDCCH related to the TDD uplink-downlink configuration is detected in the specific subframe,
    wherein a period for the reconfigured uplink-downlink configuration is 10 ms, and
    wherein the reconfigured uplink-downlink configuration is begins from a subframe 0 of a radio frame, when the specific subframe is the subframe 0 of the radio frame, and
    wherein the reconfigured uplink-downlink configuration is begins from a subframe 0 of a next radio frame after the radio frame, when the specific subframe is a subframe other than the subframe 0.

2. The method of claim 1, wherein the specific subframe is indicated by higher layer signaling.

3. A user equipment for determining an uplink-downlink configuration in a wireless communication system, the UE comprising:
    a transmitter and receiver; and
    a processor coupled with the transmitter and receiver, wherein the processor is configured to:
    monitor a physical downlink control channel (PDCCH) related to reconfiguring a TDD (Time Division Duplex) uplink-downlink configuration on a specific subframe; and
    determine a reconfigured uplink-downlink configuration based on the PDCCH related to reconfiguring the TDD uplink-downlink configuration, based on whether the PDCCH related to the TDD uplink-downlink configuration is detected in the specific subframe,
    wherein a period for the reconfigured uplink-downlink configuration is 10 ms, and
    wherein the reconfigured uplink-downlink configuration is begins from a subframe 0 of a radio frame, when the specific subframe is the subframe 0 of the radio frame, and
    wherein the reconfigured uplink-downlink configuration is begins from a subframe 0 of a next radio frame after the radio frame, when the specific subframe is a subframe other than the subframe 0.

4. The UE of claim 3, wherein the specific subframe is indicated by higher layer signaling.

* * * * *